M. MAURAN & J. H. MacMAHON.
ECONOMIC PROCESS OF PRODUCING GAS.
APPLICATION FILED MAR. 12, 1912.
1,031,017.
Patented July 2, 1912.
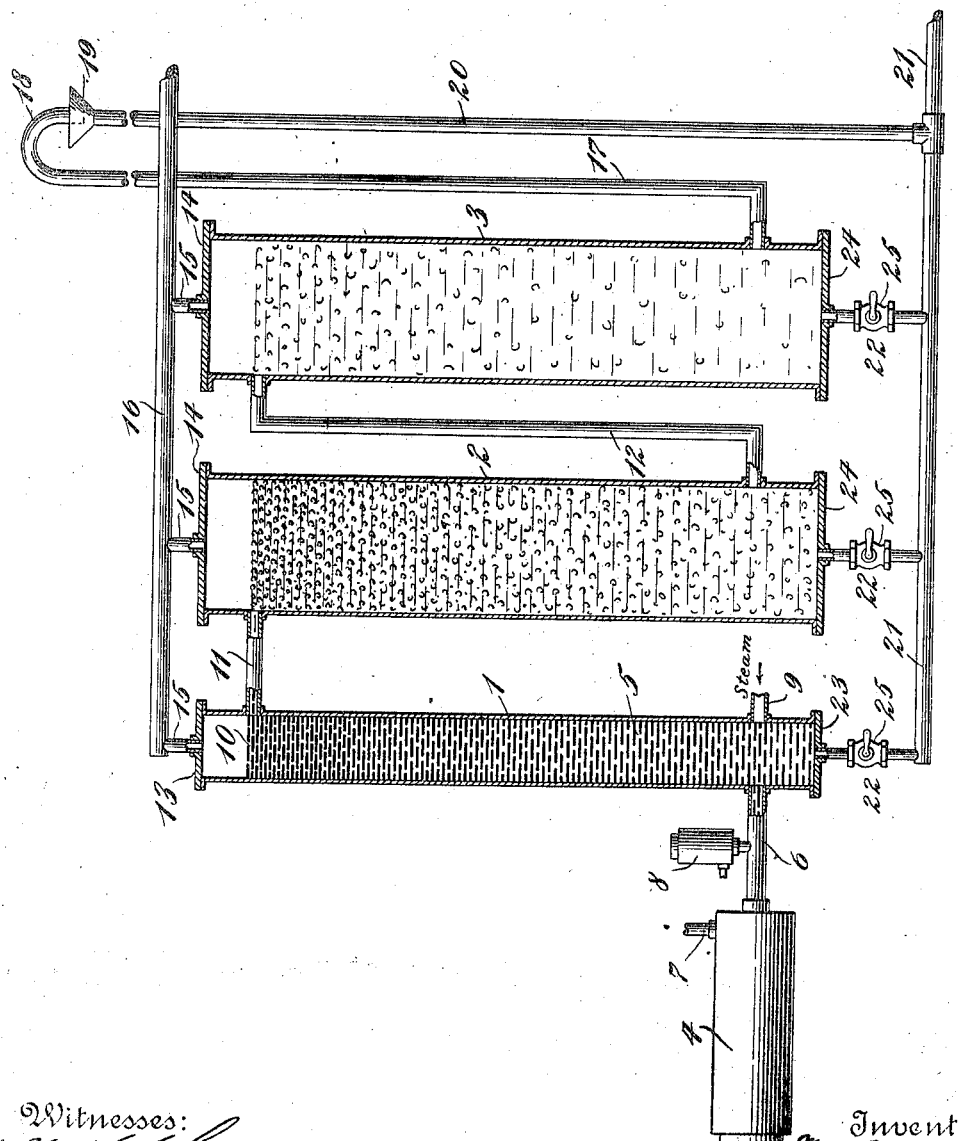
Witnesses:
Inventors
Max Mauran
James H. MacMahon
By their Attorneys

UNITED STATES PATENT OFFICE.

MAX MAURAN, OF NIAGARA FALLS, AND JAMES H. MacMAHON, OF LA SALLE, NEW YORK.

ECONOMIC PROCESS OF PRODUCING GAS.

1,031,017.  Specification of Letters Patent.  Patented July 2, 1912.

Application filed March 12, 1912. Serial No. 683,357.

*To all whom it may concern:*

Be it known that we, MAX MAURAN and JAMES H. MACMAHON, citizens of the United States, residing, respectively, at Niagara Falls and La Salle, in the county of Niagara and State of New York, have invented certain new and useful Improvements in Economic Processes of Producing Gas, of which the following is a full, clear, and exact description.

This invention relates to the production of gas from material capable of yielding the same when brought into contact with a suitable reagent or catalytic agent, and has for its principal object the provision of an improved process whereby such a gas as oxygen may be evolved from some convenient source more expeditiously than to the best of our knowledge has heretofore been possible.

A convenient source of oxygen, which latter will be the gas more particularly considered herein, is found in the hypochlorites; hypochlorite as made from ordinary bleaching powder having been commonly and indeed preferably used for this purpose by ourselves and others.

We desire to lay no claim to the specific material used as this preferred gas supplying medium; nor yet to the reaction thereon with a catalytic agent, whereby the oxygen is liberated or evolved. What we do protest as new, and desire to protect by Letters Patent, is the novel manner and means whereby the gas may be produced more rapidly and economically than in known processes.

We are aware that various modifications and changes may be made in our improved process and apparatus which are within the purview of our invention and hence desire to be limited only by the scope of the appended claims.

In the accompanying drawing, which forms a part hereof, we have somewhat diagrammatically illustrated a preferred form of apparatus adapted for use in connection with our improved process.

The figure, chosen by way of illustration, is a vertical section taken through a series of tanks in which the reactions are effectuated. These tanks have respectively been designated 1, 2 and 3. A pump 4 of any suitable description may be employed to inject fluid 5 into the first tank; the pump preferably delivering the sludge, which is the liquid or semi-liquid 5, into the lower portion of the tank 1, through the instrumentality of a connection or pipe 6. The fluid is delivered to the pump through a pipe 7 and preferably before it enters the first tank a suitable and preferably constant quantity of the catalytic agent or agents are supplied thereto by or from a feeding device, or source of said agent, designated 8. The sludge delivered to the tank 1 consists of a gas yielding material, preferably such as ordinary bleaching powder ($CaOCl_2H_2O$) or other hypochlorite in solution; and the reagent or catalytic agent is preferably a compound of cobalt, such as cobalt monoxid, $CoO$. The reagent or catalytic agent may be introduced into the mass to be treated in liquid condition, or as a loose powder, although I do not wish to be confined to any special form of the same.

As is well known, such a material as bleaching powder readily yields oxygen when brought into contact with a suitable reagent, such as nickel or cobalt oxid, and the liberated oxygen being lighter than the mass of sludge in which it is generated tends to work its way upward by reason of its lower specific gravity until it ultimately escapes from this usually rather sluggish or thickly fluid mass. It is desirable, but not absolutely essential, that the sludge be heated so as to accelerate the evolution of the gas therefrom. When it is cold, however, the gas will still be evolved under the conditions of the operation, but less rapidly. It is obvious also that the reagent or catalytic agent proper need not be introduced as such into the connection 6, but may be introduced in any suitable manner into the generator or tank 1; and it is possible also to have the catalytic agent itself formed directly within the generator, as by subjecting cobalt nitrate solution to an oxidizing agent which will precipitate cobalt oxid. A salt or oxid of cobalt, as for example cobalt monoxid, ($CoO$) is, we believe, the catalytic agent or reagent best adapted for our purpose, but as there are a number of these agents which are adapted to effect the reaction in question, we do not desire to be limited thereto. If such a substance as cobalt monoxid is employed as the catalytic agent it may during the course of the operation lose some of its efficiency, but this may be restored by known methods after it has been withdrawn from the tanks in the manner hereinatfer described. Usually, however, the same quantity of oxid may be used repeatedly, and many times, to decompose successive quantities of the hypochlorite, and it has for this reason been termed a catalytic agent.

In practice, we find that preferably somewhat less than one part by weight of cobalt oxid to one-thousand parts by weight of bleaching powder, is a desirable proportion for carrying on the reaction efficiently. The sludge is preferably made with no more water than is necessary to allow it to flow, so that the tendency for the gas to emerge therefrom when the fluid is quiescent is not as pronounced as is compatible with the efficient effectuation of the process. This is one reason why we have found, in carrying out the process described in our Patent No. 1,001,873, issued August 29, 1911, grounds for seeking an improved process.

The material in the first generator or tank 1 is preferably heated to the boiling point by injecting steam thereinto at a point adjacent the lower extremity of this tank; a section of the steam pipe being there shown and designated 9. It will be noted that the tank 1 is cylindrical in form and that the cross-sectional area thereof is relatively quite limited as compared to the length of the tank. As a result the sludge may be flowed upwardly therethrough at a tolerably rapid rate. By the term "tolerably rapid" we do not mean necessarily that it has a quick movement, because material of such a pasty consistency as characterizes the sludge forced through this tank, is not adapted for very rapid movement. In practice, the upward flow of sludge is also preferably continuous, and when it reaches the level designated 10, it is caused to flow laterally through a connection 11 into the second tank in the series, which, it will be observed, is of materially larger cross-sectional area than that first referred to. The sludge flows downwardly through this second generator or tank and emerges therefrom at a point near the bottom of the same, passing upwardly via a pipe 12 to the third tank, which it enters at a point corresponding to the entrance to tank 2. Each of the tanks are provided with air tight covers 13—14, and in each case a space is preferably provided above the mass of sludge in the respective tanks. The gas escapes into these spaces and flows through short pipes or connections 15 into a common delivery pipe 16, which may lead off if desired, to the usual scrubber and storage tank. As the latter form no part of the present invention, they have not been shown herein.

The spent sludge emerges from the bottom of the tank or generator 3 and passes upwardly through a pipe 17 to a point preferably some distance above the level of the fluid in the tanks. If desired, it may then be passed around a U-shaped bend 18 in the pipe 17 and downwardly into an open funnel 19 which is connected to a downwardly directed pipe 20. This pipe in turn delivers to a common drain pipe 21 which may be placed in communication with the bottom of each of the generators. For this purpose connections 22 connect the respective bottoms 23—24 of the generators with the pipe 21, and a suitable cock or valve 25 may be included in each of these connections. The incoming steam bubbles up through the mass of sludge in the first generator and heats and incidentally churns the same to some measure. This introduction of the heating medium directly into the body to be heated economizes fuel. It is, however, open to one objection, in that the bubbles of steam mechanically tend to retard the reaction whereby the desired gas is evolved. Further, the presence of the bubbles of gas also tend to retard this action quite materially, in that they serve to space apart, at least temporarily, portions of the fluid which would be otherwise in contact with some of the catalytic agent. This agent by reason of its mode of introduction is disseminated quite evenly throughout the mass to be treated, but it is obvious that the introduction or development of gaseous matter within this mass must deleteriously affect the speedy production or evolution of more gas. We have sought therefore to so handle the material to be treated as to facilitate the elimination therefrom of all gaseous or vaporous matters at the earliest possible moment.

Assuming that the body of rather thick sludge in the generator 1 be quiescent, a bubble of gas evolved at the bottom thereof will consume considerable time in working its way up through the body, and will in the manner aforesaid, by its very presence tend to retary the production of other gas. If, however, the whole mass be caused to flow upwardly toward a given level and then laterally off therefrom, or from a point relatively adjacent to this level, the upward speed of the bubbles will be the sum of their normal speed due to their difference in density from the mass of sludge, plus the upward speed of the said mass. The bubbles are hence much more rapidly disentrained than would be otherwise the case, and as a result we find that in practice it is possible to remove substantially 90% of all of the oxygen which may be obtained by the reactions in question from a given mass or quantity of the sludge, within ten minutes of the time that such quantity is subjected to the action of the catalytic agent. Necessarily, from the manner in which the gas is evolved the upper portions of the fluid in each of the generators is richer in oxygen than the lower portions in the respective generators. It is desirable therefore that the oxygen near the top of the mass in the generator 1, but which has not as yet escaped therefrom, be not forced to traverse the bulk of the mass in generator 2; and it is for this reason that the sludge is admitted to the upper portion of this generator, rather than to the lower portion thereof.

The cross-sectional area of the descending column of sludge in the second generator is so much greater than that of the ascending column in the first tank or generator that the movement of fluid in tank 2 is markedly less than in tank 1. In fact, it is so slow in the second tank that it does not materially retard the bubbles ascending through the latter. As a matter of fact too, the quantity of bubbles of gas arising herein is small as compared with those ascending through the first tank, so that their presence is not so markedly harmful. The quantity of the catalytic agent per unit of volume in the second generator usually remains substantially the same as in the first, although there may be some deposition of this material, or of a compound formed therefrom, to the bottom of tank 1, as, of course, there is also some toward the bottom of tanks 2 and 3. There being, however, such a large quantity of catalytic agent present in proportion to the molecules of unacted-on oxygen yielding material, that there is less retardation of the action of said agent upon said molecules per bubble. As a result, a larger portion of the remaining said molecules are acted upon in this generator or tank and the gas so evolved joins that delivered from the first tank and passes off through pipe 16 in the manner described. The action in the third tank or generator is much the same as in the second, except that relatively few bubbles of gas are evolved in the latter, the material having been robbed of most of the oxygen content which it may be deprived of by catalytic action, before it enters the third receptacle. Again, however, the percentage of catalytic agent to unacted-on molecules is materially increased, and as a result practically all of the remaining yield of oxygen is given up in this last receptacle.

The time consumed in effectuating the entire process is preferably a multiple of the time taken up by the first step therein, i. e. the passage through the first generator, and in practice I find that about one-half hour is sufficient to obtain practically the entire oxygen content available from a given quantity or feed of hypochlorite. I do not mean by this, of course, that all oxygen has been taken from the molecules which constituted the original source of oxygen, but that practically all which may be taken out by reacting thereon with such a substance, as cobalt monoxid, may be removed in this interval of time.

The process is preferably conducted continuously, at least for considerable intervals of time; but from time to time it will be necessary to drain off the deposits which will collect in the bottoms of the several tanks. This may readily be accomplished by opening the cocks 25, and, if necessary, by flushing the tanks with water which may be delivered from the pump 4.

Our process obviously results in the saving of heat, since only the first tank need be directly heated, the hot material thereafter passing successively through the remaining tanks.

It is practically essential, on the ground of economy, that sufficient quantity of the catalytic agent be present in the sludge to effect the liberation of the oxygen with reasonable rapidity, since otherwise the process will be too slow, and the prolonged boiling or heating consumes fuel. The process herein described does away with the necessity for providing beating or stirring apparatus for the sludge during the course of the operation. We may add also that the present process enables us to economize in the use of the catalytic agent employed, and while a sufficient quantity of this material is necessary for the rapid carrying out of the process, it should also be noted that it is desirable not to too greatly exceed a proper percentage of this substance as compared to the original quantity of hypochlorite used, since a superoxid of cobalt may be formed which involves not only a waste of the catalytic agent, in so far as the process is concerned, but a further waste of oxygen which might otherwise be obtained during the course of the process. To the best of our knowledge also it has not been commonly known to use a continuous flow of hypochlorite solution through an apparatus of the type in question, for the purpose of producing oxygen, and we are of the opinion that the possibility of successfully effectuating a continuous process of this description depends largely upon the related steps herein set forth. Finally, we particularly desire to emphasize the desirability of keeping the concentrated liquor from the diluted or partly used liquor; and the importance of introducing the catalytic agent in close proximity to where the heat is applied, since otherwise the hypochlorite liquor will have a tendency to be decomposed by the heat before it comes into contact with the catalytic agent; and being decomposed, of course, no oxygen would be liberated.

What we claim is:—

1. The process of producing gas which comprises reacting upon a fluid mass of gas yielding material with a catalytic agent capable of evolving gas from said material, while simultaneously effecting an upward flow of said mass toward a determined level whereby to hasten the release of evolved gas therefrom.

2. The process of producing gas which comprises reacting upon a fluid mass of gas yielding material with a catalytic agent capable of evolving gas from said material, while simultaneously effecting an upward flow of said mass toward a determined level whereby to hasten the release of evolved gas therefrom, and thereafter downwardly flowing said material while permitting residual evolved gas to ascend therethrough.

3. The process of producing gas which comprises evolving said gas within a fluid mass by reacting upon gas yielding material present in said mass with a catalytic substance disseminated therethrough while progressively flowing said mass in a definite tortuous path which traverses different levels, and withdrawing the evolved gas from contact with said mass at a plurality of points along said path 4. The process of producing gas which comprises evolving said gas within a fluid mass by reacting upon gas yielding material present in said mass with a catalytic agent capable of separating molecules of said gas from the molecules of said material, substantially continuously subjecting fresh quantities of said gas yielding material to the action of said agent, and expeditiously removing the gas as generated from said mass whereby to facilitate the continued production of the same.

5. The process of producing gas which comprises evolving said gas within a fluid mass by reacting upon gas yielding material present in said mass with a catalytic agent capable of separating molecules of said gas from the molecules of said material until the greater part of the gas obtainable from said material has been evolved, then flowing the partially spent material laterally with respect to its first position, to facilitate the disentrainment of gas therefrom, and then flowing said fluid mass generally downwardly while continuing the reaction therein, whereby to further facilitate the evolution of said gas.

6. The process of producing gas which comprises evolving said gas within a fluid mass divided into a plurality of substantially distinct bodies one of which is materially richer in gas yielding material than is a succeeding one of said bodies, withdrawing a large part of said gas from said first body while reacting upon the gas yielding material therein with a catalytic agent, replacing said succeeding body by material including the partially spent gas yielding material in said first mentioned body, and continuing to react on said partially spent material with said catalytic agent while collecting said gas therefrom.

7. The process of producing gas which comprises evolving said gas within a fluid mass containing a material capable of yielding the desired gas when reacted upon by a catalytic agent, by bringing said material into contact with said agent, establishing an upward flow in a portion of said mass whereby to aid the disengagement of said gas from said portion, and downwardly flowing said portion, thereafter, at a less speed than that of the upward flow aforesaid.

8. The process of producing gas which comprises evolving said gas within a fluid mass containing a material capable of yielding the desired gas when reacted upon by a catalytic agent, by bringing said material into contact with said agent, establishing a flow of said mass through a determined course, and varying the speed of flow in different portions of said course.

9. The process of producing gas which comprises evolving said gas within a fluid mass containing a material capable of yielding the desired gas when reacted upon by a catalytic agent, by bringing said material into contact with said agent, establishing a flow of said mass through a determined course, and varying the speed of flow in different portions of said course, said speed of flow being more rapid in a first part of said course than in a succeeding portion.

10. The process of producing gas from a material capable of yielding the same which comprises reacting upon said material with a re-agent capable of reacting therewith to form said gas, while flowing said material upwardly from one level to another, thereafter flowing the partially spent material downwardly from one level to another, but at a speed which is less than that at which it was flowed upwardly in the preceding operation, and continuing to evolve said gas within the body of said partially spent material during said downward flow of the same.

11. The process of producing gas from a material capable of yielding the same which comprises reacting upon said material with a reagent capable of reacting therewith to form said gas while heating said material by injecting steam thereinto, and while flowing said material upwardly from one level to another, and laterally, whereby to aid the escape of both the steam and evolved gas from said material.

12. The process of producing gas which comprises evolving said gas within a fluid mass by reacting upon gas yielding material present in said mass with a catalytic substance disseminated therethrough while progressively flowing said mass in a definite path, and withdrawing the evolved gas from contact with said mass at a plurality of points along said path.

In witness whereof, we subscribe our signatures, in the presence of two witnesses.

MAX MAURAN.
JAMES H. MacMAHON.

Witnesses:
H. H. HACKENHEIMER,
CHAS. F. VAUGHN.

Copies of this patent may be obtained for five cents each, by addressing the "Commissioner of Patents, Washington, D. C."